Z. E. HOUSE.
AUTOGRAPHIC ATTACHMENT FOR CAMERAS.
APPLICATION FILED JAN. 26, 1916.
1,238,674.
Patented Aug. 28, 1917.
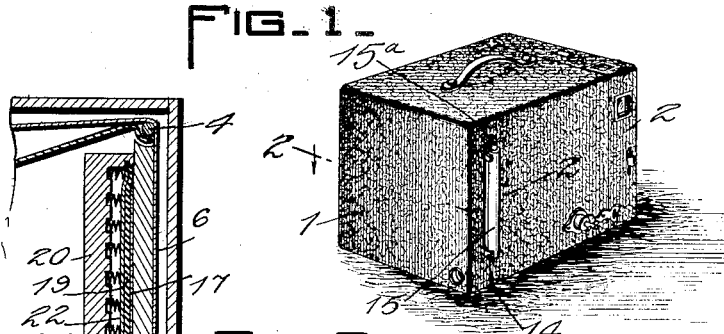
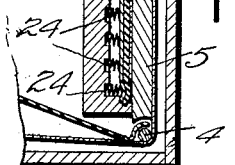
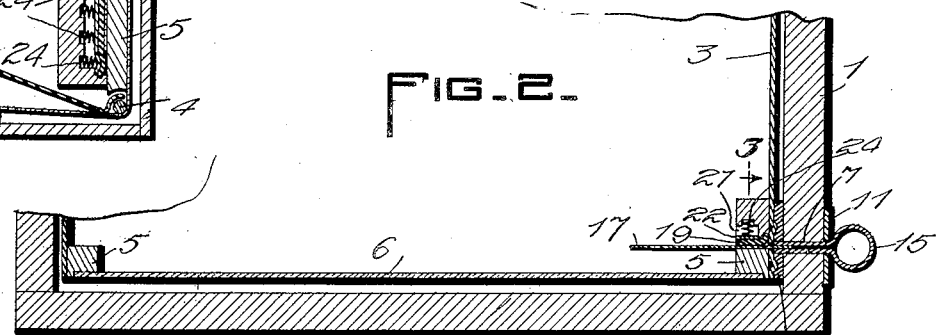
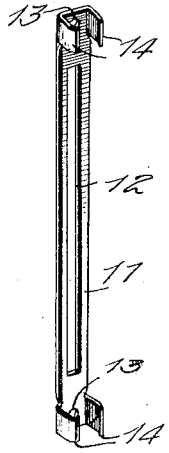
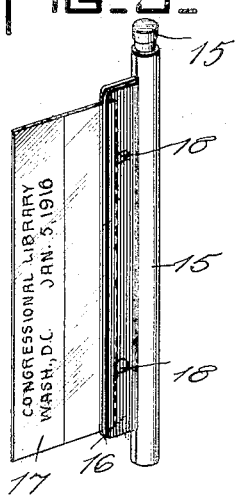
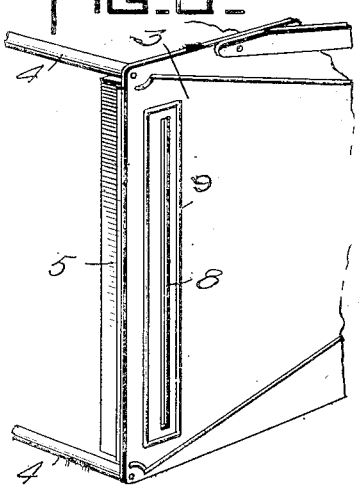
WITNESSES:
INVENTOR
ZACHARIAH E. HOUSE,
BY Munn & Co.
ATTORNEYS

UNITED STATES PATENT OFFICE.

ZACHARIAH E. HOUSE, OF CASS LAKE, MINNESOTA, ASSIGNOR OF ONE-HALF TO IRA C. CURTIS, OF CASS LAKE, MINNESOTA.

AUTOGRAPHIC ATTACHMENT FOR CAMERAS.

1,238,674.  Specification of Letters Patent. Patented Aug. 28, 1917.

Application filed January 26, 1916. Serial No. 74,314.

*To all whom it may concern:*

Be it known that I, ZACHARIAH E. HOUSE, a citizen of the United States, and a resident of Cass Lake, in the county of Cass and State of Minnesota, have invented certain new and useful Improvements in Autographic Attachments for Cameras, of which the following is a specification.

My invention is an improvement in autographic attachments for cameras, and the invention has for its object to provide an attachment of the character specified, for use in connection with cameras of any type, wherein the camera is provided with a slot or passage in one side wall, parallel with the plane of the film or plate when in position to be exposed, and between the film in such position and the lens, and wherein a holder is provided having a sheet of transparent material adapted to receive written or printed data, the holder being adapted to engage within the slot or passage, and the sheet being adapted to extend through the slot or passage in a position between one side edge of the film and the lens, to cause the data to be impressed upon the film when it is exposed, and wherein means is also provided in connection with the camera at the slot or passage for engaging the holder to prevent dislocation thereof during exposure, and wherein light excluding means is provided at the slot or passage, normally operative to close the said slot or passage when the holder and the sheet are removed, and to exclude the light when the sheet and holder are in place.

In the drawings:

Figure 1 is a perspective view of a camera provided with the improved attachment;

Fig. 2 is an enlarged section taken substantially on the line 2—2 of Fig. 1, looking in the direction of the arrow adjacent to the line;

Fig. 3 is a section on the line 3—3 of Fig. 2, looking in the direction of the arrows adjacent to the line;

Fig. 4 is a perspective view of the means in connection with the camera for holding the attachment in place;

Fig. 5 is a perspective view of the holder and sheet; and

Fig. 6 is a perspective view of a part of the inner casing of the camera showing the arrangement of slot or passage.

The present embodiment of the invention is shown in connection with a camera consisting of a sectional outer casing, the said casing consisting of a body 1 and a cover or closure 2. The inner casing is connected with the cover or closure 2, in such manner that the said inner casing may be removed with the cover or closure, and the said inner casing is of usual construction, having the reels for supporting the film, and consisting of side plates 3 of metal or the like, which are connected by transverse rods 4 at the rear of the said inner casing.

The plates 3 are braced and reinforced at the rods 4 by vertical posts 5, the said posts being arranged on the inner face of the rear end of each of the plates 3, and that portion 6 of the film to be exposed, passes over the rods 4 from the uppermost rod to the lowermost rod, the side edges of the film being supported by the bars 5, as shown in Figs. 2 and 3.

In one side wall, the body 1 of the outer casing is provided with a slot or passage 7, the said slot or passage being parallel with that portion of the film 6 which is in position to be exposed, and between the said portion and the lens.

The adjacent plate 3 of the inner casing is provided with a similar slot or passage 8, which is adapted to register with the passage 7, when the inner casing is in place in the outer casing, and as shown in Fig. 6, a bead 9 surrounds the slot or passage 8, the said bead being on the outer face of the plate 3, and extending entirely around the slot or passage in rectangular outline.

A strip 10 of felt or the like is arranged on the inner face of the side wall of the body provided with the slot or passage 7, at the said slot or passage, and the felt has an opening registering with the slots or passages 7 and 8.

The bead 9 of the inner casing, when the said casing is in place in the outer casing, is pressed into the strip 10, as shown in Fig. 2, thus making an effectual light tight seal at this point.

A plate 11 is secured to the outer face of the side wall of the camera at the slot or passage 7, the said plate having a longitudinally extending slot 12 registering with the slot or passage 7, and the said plate is secured to the camera wall by means of screws or the like which pass through openings 13 in the ends of the plate.

This plate is provided at each end with a resilient clip 14, in the form of a pair of coöperating spring tongues, for a purpose to be later described, and the members of each pair are at opposite sides of the adjacent opening 13.

A holder is provided for holding the transparent sheet, the said holder consisting of a cylindrical handle portion 15 formed by bending a suitable piece of sheet metal in the form of a split cylinder, and at each side edge of the split the cylinder has a radial flange 16.

These flanges are of less length than the length of the cylinder, and the ends of the flanges are spaced apart from the ends of the cylinder as shown.

The sheet 17 of transparent material, which may be celluloid or like suitable material, has one side edge received between the flanges 16, and rivets 18 or the like are passed through registering openings in the flanges and act to clamp the flanges together on the strip, and thus form a detachable connection permitting interchange of strips when desired.

The strip 17 is adapted to receive data which may be made thereon in ink or pencil, in regard to the pictures taken. For instance, the subject, place, and the date may be placed on the strip, as shown in Fig. 5, or the autograph of the operator, and it will be obvious that when this portion of the strip is inserted between the film and the lens and the film is exposed, the printed or written data on the strip will be impressed on the film or plate.

The strip is of a width such that the printed or written matter, which is near the side edge of the strip remote from the holder, will extend over that portion of the film in position to be exposed, and it will be obvious that when the said portion of the film is exposed, the opaque characters of the written or printed matter on the strip will be impressed on the film or plate.

The portion 15 of the holder is of such length that the extended ends thereof, that is, those portions beyond the ends of the flanges 16, will slip in between the members of the pairs of clips, and the clips being resilient will lock the holder and the strip in place in the slot or passage 7 and in the opening 8 of the inner casing.

Means is also provided for excluding light when the holder and the strip are withdrawn, and for making a light tight seal when the holder and strip are in place. The slot or passage 7 and the slot or passage 8 are arranged at the inner face of the adjacent bar 5, in such position that when the holder and the strip are inserted, that face of the strip which is adjacent to the film 6 will abut the inner face of the said bar.

A plate 19 is arranged at the opposite side of the strip, for pressing the strip toward the bar 5, and spring mechanism is provided on the opposite side of the plate from the strip for pressing the plate toward the strip and toward the bar 5.

A bar 20 is secured to the inner face of the plate 3 provided with the slot or passage 8, on the opposite side of the said passage from the bar 5, and the said bar is recessed as indicated at 21 on the face adjacent to the strip.

The plate 19, which is of felt or like soft material, and which is reinforced on the face remote from the strip with a strip or plate 22 of sheet material slightly stiffer than the felt, as for instance paper, is pressed toward the strip 17 by means of a series of coil springs 23, the said springs being arranged in the recess 21, one end of each spring engaging the strip or plate 22, and the other being seated in a recess 24 in the bottom of the recess 21.

It will be noticed from an inspection of Fig. 3, that the ends of the plates 19 and 22 are held in notches or recesses at the ends of the recess 21, and that that side edge of the strip or plate 19 which is outward, is held in a similar recess and in an outwardly bent position, so that entrance of the strip 17 will be facilitated.

While the attachment is shown in connection with a box camera, it is obvious that it might be used with equal facility in a folding camera, and while it is shown in connection with films, it might be used with plates in the same manner.

In use, when the operator desires to make a record upon an exposure, he will write such record on the strip 17, as indicated in Fig. 5. When he is ready to expose the film or plate, he will introduce this record into the camera in front of the film or plate, by engaging the free edge of the strip 17 with the slot or passage 7. The holder is pushed directly in, and the spring clips 14 by their engagement with the extended ends of the body of the holder prevent displacement of the strip.

The plates 19 and 22 effectually exclude all light, whether the strip is in place or whether it is withdrawn. When the strip is in place, the plate 19 is pressed tightly against the same, pressing the strip between the said plate and the bar 5. When the strip is withdrawn, the plate is pressed tightly against the bar 5.

A strip of felt may be arranged on the inner face of the bar 5, if desired. It will be noticed that the normal operation of the camera is in no manner affected by the attachment in question.

The cylindrical form of the handle portion 15 before described permits of its reception and support of a pencil or other implement 15ª, as seen in Figs. 1 and 5, it being observed that the transparent strip 17 may be provided with the desired data by the use of either ink, crayon, or glass marking pencil.

I claim:

The combination with a camera provided in one side wall with a slot or passage parallel with the plane of the film to be exposed and between the film and the lens, said camera having holding clips at the end of the slot, and a holder having radial flanges extending longitudinally thereof intermediate its ends, the ends being adapted to engage the clips, a sheet of transparent material held between the flanges and adapted to enter the slot or passage, said camera having light excluding means for engaging the sheet when the holder is in place.

ZACHARIAH E. HOUSE.

Witnesses:
 AL J. HAU,
 E. M. DUNPHY.